(12) United States Patent
Malladi et al.

(10) Patent No.: US 7,460,725 B2
(45) Date of Patent: Dec. 2, 2008

(54) SYSTEM AND METHOD FOR EFFECTIVELY ENCODING AND DECODING ELECTRONIC INFORMATION

(75) Inventors: Krishna Mohan Malladi, San Jose, CA (US); B. Anil Kumar, Saratoga, CA (US); Neal Margulis, Woodside, CA (US)

(73) Assignee: Calista Technologies, Inc., San Jose, CA (US)

( * ) Notice: Subject to any disclaimer, the term of this patent is extended or adjusted under 35 U.S.C. 154(b) by 106 days.

(21) Appl. No.: 11/595,505

(22) Filed: Nov. 9, 2006

(65) Prior Publication Data

US 2008/0112489 A1      May 15, 2008

(51) Int. Cl.
G06K 9/36      (2006.01)
G06K 9/46      (2006.01)

(52) U.S. Cl. .................................................... 382/240

(58) Field of Classification Search ................. 382/162, 382/164, 173, 218, 219, 232, 233, 240, 250, 382/251; 345/589, 600–604; 375/240.03, 375/240.12, 240.18, 240.21, 240.24
See application file for complete search history.

(56) References Cited

U.S. PATENT DOCUMENTS

| | | | |
|---|---|---|---|
| 5,602,589 A | 2/1997 | Vishwanath | |
| 5,708,961 A | 1/1998 | Hylton | |
| 5,850,482 A | 12/1998 | Meany | |
| 5,852,437 A | 12/1998 | Wugofski | |
| 5,909,518 A | 6/1999 | Chui | |
| 5,911,582 A | 6/1999 | Redford | |
| 5,977,933 A | 11/1999 | Wicher | |
| 6,031,940 A | 2/2000 | Chui | |
| 6,075,906 A | 6/2000 | Fenwick | |
| 6,097,441 A | 8/2000 | Allport | |
| 6,101,284 A * | 8/2000 | Matsubara et al. | 382/260 |
| 6,104,334 A | 8/2000 | Allport | |
| 6,141,059 A | 10/2000 | Boyce | |
| 6,141,447 A | 10/2000 | Linzer | |
| 6,222,885 B1 | 4/2001 | Chadda | |
| 6,263,503 B1 | 7/2001 | Margulis | |
| 6,332,043 B1 * | 12/2001 | Ogata | 382/240 |
| 6,340,994 B1 | 1/2002 | Margulis | |
| 6,409,602 B1 | 6/2002 | Wiltshire | |
| 6,437,803 B1 | 8/2002 | Panasyuk | |

(Continued)

OTHER PUBLICATIONS

Skodras et al., "JPEG2000: The Upcoming Still Image Compression Standard," May 11, 2000, 14 pages.

(Continued)

Primary Examiner—Amir Alavi
(74) Attorney, Agent, or Firm—Woodcock Washburn LLP

(57) ABSTRACT

A system and method for effectively encoding and decoding electronic information includes an encoding system with a tiling module that initially divides source image data into data tiles. A frame differencing module then outputs only altered data tiles to various processing modules that convert the altered data tiles into corresponding tile components. A quantizer performs a compression procedure upon the tile components to generate compressed data according to an adjustable quantization parameter. An adaptive entropy selector then selects one of a plurality of available entropy encoders to most effectively perform an entropy encoding procedure to thereby produce encoded data. The entropy encoder may also utilize a feedback loop to adjust the quantization parameter in light of current transmission bandwidth characteristics.

30 Claims, 13 Drawing Sheets

U.S. PATENT DOCUMENTS

| | | |
|---|---|---|
| 6,456,340 B1 | 9/2002 | Margulis |
| 6,510,177 B1 | 1/2003 | De Bonet |
| 6,600,838 B2 | 7/2003 | Chui |
| 6,611,530 B1 | 8/2003 | Apostolopoulos |
| 6,628,716 B1 | 9/2003 | Tan |
| 6,643,406 B1 * | 11/2003 | Hajjahmad et al. .......... 382/240 |
| 6,658,019 B1 | 12/2003 | Chen |
| 6,701,380 B2 | 3/2004 | Schneider |
| 6,721,837 B2 | 4/2004 | MacInnis |
| 6,754,266 B2 | 6/2004 | Bahl |
| 6,757,851 B1 | 6/2004 | Park |
| 6,768,775 B1 | 7/2004 | Wen |
| 6,771,828 B1 | 8/2004 | Malvar |
| 6,774,912 B1 | 8/2004 | Ahmed |
| 6,781,601 B2 | 8/2004 | Cheung |
| 6,785,700 B2 | 8/2004 | Masud |
| 6,798,838 B1 | 9/2004 | Ngo |
| 6,807,308 B2 | 10/2004 | Chui |
| 6,816,194 B2 | 11/2004 | Zhang |
| 6,826,242 B2 | 11/2004 | Ojard |
| 6,834,123 B2 | 12/2004 | Acharya |
| 6,839,079 B2 | 1/2005 | Barlow |
| 6,842,777 B1 | 1/2005 | Tuli |
| 6,847,468 B2 | 1/2005 | Ferriere |
| 6,850,571 B2 | 2/2005 | Tardif |
| 6,850,649 B1 | 2/2005 | Malvar |
| 6,853,385 B1 | 2/2005 | MacInnis |
| 6,868,083 B2 | 3/2005 | Apostolopoulos |
| 6,898,583 B1 | 5/2005 | Rising |
| 7,006,697 B1 * | 2/2006 | Gormish et al. ............. 382/234 |
| 7,024,046 B2 * | 4/2006 | Dekel et al. ................. 382/240 |
| 7,099,515 B2 * | 8/2006 | Lin et al. .................... 382/240 |
| 7,127,117 B2 * | 10/2006 | Sano et al. .................. 382/240 |
| 7,164,801 B2 * | 1/2007 | Suarez et al. ............... 382/240 |
| 7,215,820 B2 * | 5/2007 | Zandi et al. ................. 382/240 |
| 7,224,845 B1 * | 5/2007 | Russo et al. ................. 382/240 |
| 7,242,811 B2 * | 7/2007 | Fenney ....................... 382/240 |
| 7,260,266 B2 * | 8/2007 | Nakajima et al. ........... 382/240 |
| 7,330,596 B2 * | 2/2008 | Suino et al. ................. 382/240 |
| 2006/0209952 A1 | 9/2006 | Tanizawa et al. ....... 375/240.04 |

OTHER PUBLICATIONS

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

Luk Verboven, "Wireless Technology Update," Anixter Technology Group, 5 pages, Mar. 2004, reprints from Network World, Mar. 29, 2004 and unattributed.

Bejerano et al., "A Framework for Fairness and QoS Assurance in Current IEEE 802.11 Networks . . . " IEEE INFOCOM 2004, 12 pages, Bell Labs, Murray Hill NJ.

Lindgren et al., "Quality of Service Schemes for IEEE 802.11," 7 pages, Lulea University of Technology, Lulea, Sweden 2003.

Godfrey, "Inside 802.11e: Making QoS a Reality over WLAN Connections," GlobespanVirata, Dec. 19, 2003, 8 pages, http://www.commsdesign.com/showArticle.jhtml?articleID=17000388.

* cited by examiner

| | C | Descriptor |
|---|---|---|
| macroblock_layer( ) { | | |
|   mb_type | 2 | ue(v) \| ae(v) |
|   if( mb_type == I_PCM ) { | | |
|     while( !byte_aligned( ) ) | | |
|       pcm_alignment_zero_bit | 2 | f(1) |
|     for( i = 0; i < 256; i++ ) | | |
|       pcm_sample_luma[ i ] | 2 | u(v) |
|     for( i = 0; i < 2 * MbWidthC * MbHeightC; i++ ) | | |
|       pcm_sample_chroma[ i ] | 2 | u(v) |
|   } else { | | |
|     noSubMbPartSizeLessThan8x8Flag = 1 | | |
|     if( mb_type != I_NxN && <br>      MbPartPredMode( mb_type, 0 ) != Intra_16x16 && <br>      NumMbPart( mb_type ) == 4 ) { | | |
|       sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if( transform_8x8_mode_flag && mb_type == I_NxN ) | | |
|         transform_size_8x8_flag | 2 | u(1) \| ae(v) |
|       mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && <br>        transform_8x8_mode_flag && mb_type != I_NxN && <br>        noSubMbPartSizeLessThan8x8Flag && <br>        ( mb_type != B_Direct_16x16 \|\| direct_8x8_inference_flag ) ) | | |
|         transform_size_8x8_flag | 2 | u(1) \| ae(v) |
|     } | | |
|     if( CodedBlockPatternLuma > 0 \|\| CodedBlockPatternChroma > 0 \|\| <br>      MbPartPredMode( mb_type, 0 ) == Intra_16x16 ) { | | |
|       mb_qp_delta | 2 | se(v) \| ae(v) |
|       residual( ) | 3 \| 4 | |
|     } | | |
|   } | | |
| } | | |

1050 — SEQUENCE HEADER PARAMETERS
- NAL-REF- IDC=1,NAL_UNIT_TYPE = 0x7
- PROFILE = 0x4D
- CONSTRAINED - SET0- FLAG = 0
- CONSTRAINED - SET1- FLAG = 1
- CONSTRAINED - SET2- FLAG = 1
- LEVEL IDC = 11
- SEQUENCE PARAMETER SET ID = 0
- LOG2(MAX_FRAME_COUNT)  -4 = 4
- PIC- ORDER- CNT- TYPE = 0
- NUM- REF- FRAMES = 4
- FRAME- NUM- UPDATE- FLAG = 0
- PIC- WIDTH -IN-MB- 1 = 0
- PIC- HEIGHT -IN-MB- 1 = 3*NUMBER OF MACROBLOCKS PER TILE - 1 TO TREAT EACH OF YUV COMPONENTS AS A MONOCHROME COMPONENT
- FRAME- MBS- ONLY- FLAG = 1
- DIRECT -8X8- INFERENCE - FLAG=1
- FRAME- CROPPING- FLAG=0
- VIDEO- SIGNAL- PRESENT- FLAG=0

1052 — PICTURE HEADER PARAMETERS
- NAL-REF- IDC=1,NAL_UNIT_TYPE = 0x8
- PIC- PARAMETER -SET- ID =1
- SEQ- PARAMETER -SET- ID=1
- SET-  ENTROPY MODE TO CABAC = 1
- PIC- ORDER- PRESENT FLAG = 0
- NUM- SLICE- GROUPS- MINUS1 = 0
- NUM- REF- IDX- ACTIVE0 = 0
- NUM- REF- IDX- ACTIVE1 = 0
- WEIGHTED - PRED- FLAG = 0
- WEIGHTED  - BIPRED- FLAG = 0
- PIC- INIT- QP = 0
- PIC- INIT- QS = 0
- CHROMA -QP- INDEX- OFFSET = 0
- DEBLOCKING - FILTER- PARAMETERS - PRESENT- FLAG = 0
- CONSTRAINED - INTRA- PRED- FLAG=0
- REDUNDANT -PIC- CNT- PRESENT- FLAG=0
- TRAILING 1 = 1

1054 — SLICE HEADER PARAMETERS
- NAL-REF- IDC=1,NAL_UNIT_TYPE = 0x5
- FIRST MB IN SLICE = 0
- SLICE TYPE = 2
- PIC- PARAMETER -SET- ID = 0
- FRAME NUMBER FOR IDR PICTURE = 0
- FRAME- NUM = 0
- PIC- ORDER- CNT- LSB = 0
- NO- OUTPUT -OF- PRIOR- PICS- FLAG = 0
- LONG- TERM- REFERENCE - FLAG = 0
- SLICE-QP- DELTA = 0

1056 — MACROBLOCK HEADER PARAMETERS
1058 — MB_TYPE = 0 OR 13
- PREV & REM_- INTRA4X4 PRED FLAGS = 1 FOR MBTYPE 0
- INTRA- CHROMA -PRED- FLAG = 0

1060 — CODED- BLOCK- PATTERN = 15  AND U,V COMPENENTS ARE TREATED AS SEPARATE MBS
- MB-QP- DELTA = 0
- 256 RESIDUAL COEFFICIENTS FOLLOW

SYSTEM AND METHOD FOR EFFECTIVELY ENCODING AND DECODING ELECTRONIC INFORMATION

BACKGROUND SECTION

1. Field of Invention

This invention relates generally to techniques for processing electronic information, and relates more particularly to a system and method for effectively encoding and decoding electronic information.

2. Description of the Background Art

Implementing effective methods for processing electronic information is a significant consideration for designers and manufacturers of contemporary electronic devices. However, effectively implementing electronic devices may create substantial challenges for device designers. For example, enhanced demands for increased device functionality and performance may require more system processing power and require additional hardware or software resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various system components. For example, an enhanced electronic device that effectively processes image data may benefit from an efficient implementation because of the large amount and complexity of the digital data involved.

Due to growing demands on system resources and substantially increasing data magnitudes, it is apparent that developing new techniques for implementing and utilizing electronic devices is a matter of concern for related electronic technologies. Therefore, for all the foregoing reasons, developing effective techniques for processing electronic information remains a significant consideration for designers, manufacturers, and users of contemporary electronic devices.

SUMMARY

In accordance with the present invention, a system and method are disclosed for effectively encoding and decoding electronic information. In accordance with one embodiment of the present invention, an encoding system initially receives a source image from any appropriate data source. The source image may be configured according to any desired data format. For example, in certain embodiments, the source image may be implemented as an array of digital picture elements (pixels) in a known RGB format.

The encoding system then utilizes a tiling module to divide the source image into individual tiles that are implemented as contiguous sections of image data from the source image. The encoding system selects a current tile from the source image. A frame differencing module then compares the current tile to a corresponding comparison tile from a previous frame to determine whether the current tile has been altered with respect to the comparison tile from the immediately preceding frame. If the pixels in the current tile have not been altered, then the frame differencing module does not output the current tile. The frame differencing module then repeatedly accesses, compares, and outputs appropriate additional tiles (if available) from the source image in a similar manner.

The frame differencing module outputs the altered tiles to a DC shift module that adds a constant DC voltage value to each pixel of the tiles that are output from the frame differencing module. A color converter converts each of the altered tiles from a first color format to a second color format that is appropriate for further processing by the encoding system. For example, in certain embodiments, the source image may initially be received in an RGB format that the color converter may then responsively convert into a corresponding YUV format.

A discrete wavelet transform module (DWT) next performs a discrete wavelet transform procedure to transform the individual color components of the tiles into corresponding color subbands. A quantizer module next performs a quantization procedure by utilizing appropriate quantization techniques to compress the color subbands. In certain embodiments, the quantizer produces compressed image data by reducing the bit rate of the color subbands according to a particular compression ratio that is specified by an adaptive quantization parameter.

In certain embodiments, an adaptive entropy selector of an entropy encoder next selects an appropriate entropy mode (either CABAC mode or RLE mode) for performing an entropy encoding procedure based upon certain pre-determined encoding mode selection criteria. If CABAC mode is selected, then the encoding system performs a CABAC configuration procedure that defines certain specific configuration parameters for operating a CABAC encoder to optimally encode the compressed image data received from the quantizer. The entropy encoder performs an entropy encoding procedure upon the compressed data by utilizing the appropriate entropy mode (either CABAC mode or RLE mode) that was previously selected by the adaptive entropy selector. The encoding system may then provide the encoded data to any appropriate data destination(s).

In certain embodiments, the encoding system may further perform a bit-rate control procedure by initially determining whether the quality and bit-rate of the encoded data are acceptable in light of one or more pre-defined image assessment criteria. If the encoding system determines that the quality and bit-rate of the encoded data are not acceptable, then a bit rate controller of the entropy encoder may adjust and provide an adaptive quantization parameter via a feedback loop to the quantizer to alter the bit rate of the compressed image data according to a particular compression ratio that is specified by the adaptive quantization parameter.

In accordance with certain embodiments of the present invention, a corresponding decoding system may be utilized to perform a decoding procedure upon the encoded data from the encoding system. The decoding system operates to essentially reverse the various individual process steps performed by the encoding system to thereby decode and regenerate the original source data. For at least the foregoing reasons, the present invention therefore provides an improved a system and method for effectively encoding and decoding electronic information.

BRIEF DESCRIPTION OF THE DRAWINGS

FIGS. 10A-B are diagrams illustrating certain techniques for performing a CABAC configuration procedure, in accordance one embodiment with the present invention;

DETAILED DESCRIPTION

The present invention relates to an improvement in electronic information processing systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively encoding and decoding electronic information, and may include an encoding system with a tiling module that initially divides source image data into data tiles. A frame differencing module then outputs only altered data tiles to various processing modules that convert the altered data tiles into corresponding tile components.

A quantizer performs a compression procedure upon the tile components to generate compressed data according to an adjustable quantization parameter. An adaptive entropy selector then selects one of a plurality of available entropy encoders to most effectively perform an entropy encoding procedure to thereby produce encoded data. The entropy encoder may also utilize a feedback loop to adjust the quantization parameter in light of current transmission bandwidth characteristics.

Figure 1:
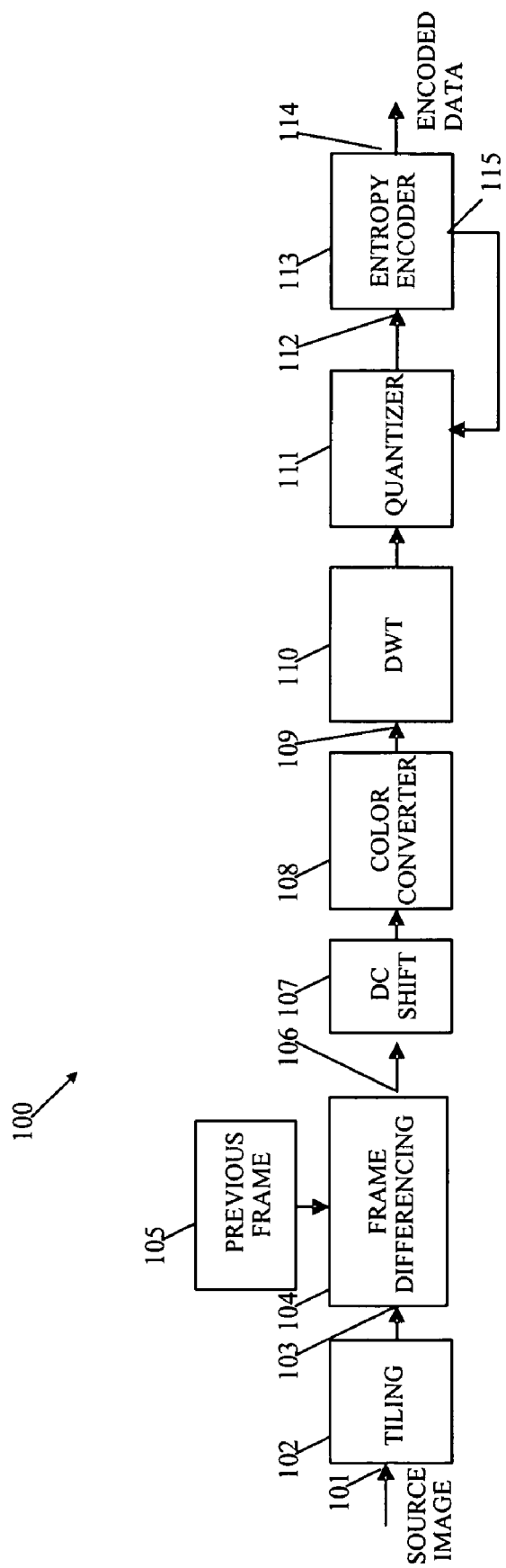
FIG. 1 is a block diagram for one embodiment of an encoding system, in accordance with the present invention.

Referring now to FIG. 1, a block diagram of an encoding system 100 is shown, in accordance with one embodiment of the present invention. In alternate embodiments, encoding system 100 may be implemented using components and configurations in addition to, or instead of, certain of those components and configurations discussed below in conjunction with the FIG. 1 embodiment. For example, in the FIG. 1 embodiment, encoding system 100 is discussed in the context of processing image data. However, in alternate embodiments, certain concepts and techniques from the present invention may be similarly utilized for processing other types of electronic information.

In the FIG. 1 embodiment, encoding system 100 initially receives source image 101 as a frame of image data from any appropriate data source. In the FIG. 1 embodiment, a tiling module 102 then divides source image 101 into individual tiles that are implemented as contiguous sections of image data from source image 101. The individual tiles may be configured in any desired manner. For example, in certain embodiments, an individual tile may be implemented as a pixel array that is 128 pixels wide by 128 pixels high.

In the FIG. 1 embodiment, a frame differencing module 104 compares the current source image 101, on a tile-by-tile basis, with similarly-located comparison tiles from a previous frame 105 of input image data. To reduce the total number of tiles that require encoding, frame differencing module 104 then advantageously outputs via path 106 only those altered tiles from the current source image 101 that are different from corresponding comparison tiles in previous frame 105. Additional frame differencing techniques are further discussed below in conjunction with FIG. 3.

In the FIG. 1 embodiment, a DC shift module 107 next adds a constant DC voltage value to each pixel from the tiles that are output from frame differencing module 104. A color converter 108 also converts each of the tiles from a first color format to a second color format that is appropriate for further processing by encoding system 100. For example, in certain embodiments, source image 101 may initially be received in an RGB format that color converter 108 then responsively converts into a corresponding YUV format.

In the FIG. 1 embodiment, a discrete wavelet transform module (DWT) 110 performs a known discrete wavelet transform procedure to transform the individual YUV components of the tiles into corresponding YUV tile subbands. Additional details of discrete wavelet transforms are further discussed in "The JPEG 2000 Still Image Compression Standard," by Athanassios Skodras et al., published in IEEE Signal Processing Magazine, September 2001.

A quantizer module 111 next performs a quantization procedure by utilizing appropriate quantization techniques to compress the tile subbands. In the FIG. 1 embodiment, quantizer 111 produces compressed image data 112 by reducing the bit rate of the tiles according to a particular compression ratio that is specified by an adaptive quantization parameter 115 received via a feedback loop from entropy encoder 113. Various additional techniques for performing bit rate control procedures are further discussed below in conjunction with FIG. 5.

In the FIG. 1 embodiment, entropy encoder 113 performs an entropy encoding procedure to effectively generate encoded data 114. In certain embodiments, the entropy encoding procedure further reduces the bit rate of the compressed image data by substituting appropriate codes for corresponding bit patterns in the compressed image data received from quantizer 111. Various embodiments for implementing and utilizing entropy encoder 113 are further discussed below in conjunction with FIG. 5.

Furthermore, in certain alternate embodiments, a System-On-Chip (SOC) device may include encoding system 100 in conjunction with a Central Processing Unit and/or a Graphics Processing Unit. The Graphics Processing Unit may programmatically perform a Discrete Wavelet Transform analysis function to feed subbands to a quantizer. The Graphics Processing Unit may also include CABAC encoders for generating encoded data from the compressed data received from the quantizer.

This form of integration is efficient because the data for encoding is available to the Graphics Processing Unit, and does not have to be provided by Direct Memory Access techniques into memory of the encoding systems for processing. A corresponding decoding system or System-On-Chip may include other processing elements including a Graphics Processing Unit for performing traditional graphics processing operations such as Bit Block Transfers (BitBlit), up and down scaling, line drawing, as well as supporting a robust windowing system.

In the FIG. 1 embodiment, encoding system 100 is disclosed and discussed as being implemented primarily as hardware circuitry. In certain embodiments, encoding system 100 may be implemented as a single integrated-circuit device. However, in alternate embodiments, some or all of the functions of the present invention may be performed by appropriate software instructions that are executed to effectively perform various functions discussed herein.

Figure 2:
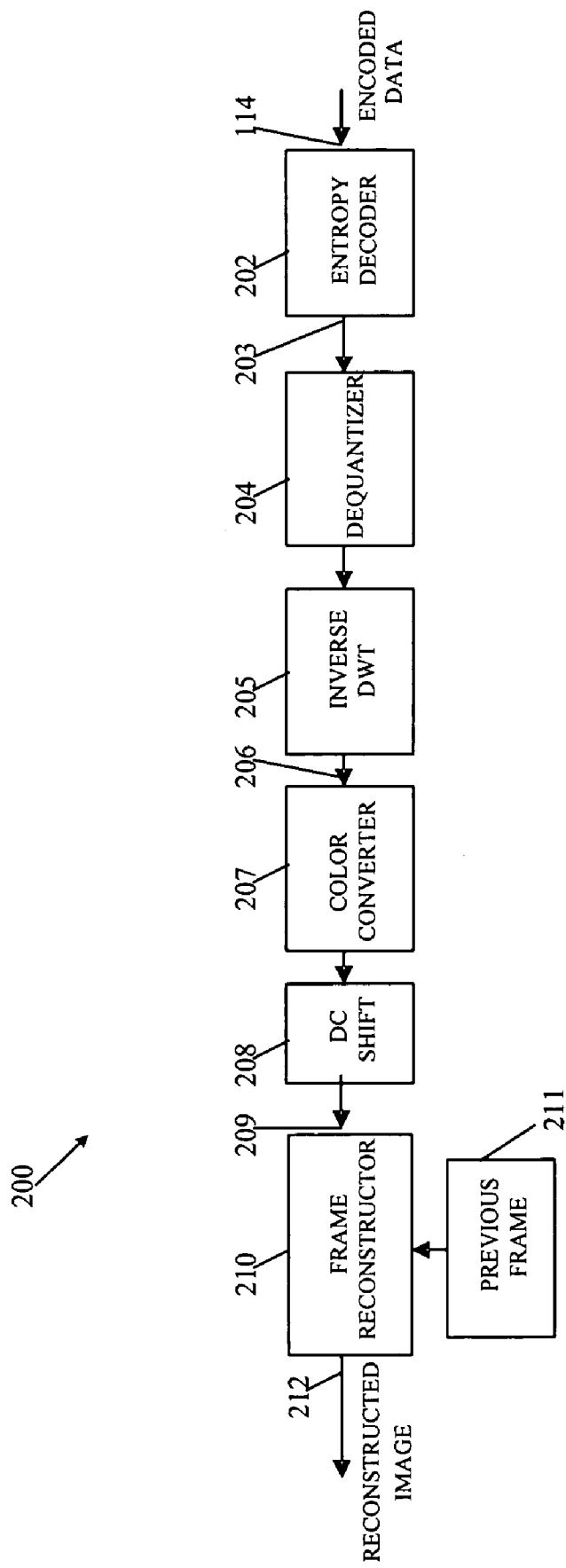
FIG. 2 is a block diagram for one embodiment of a decoding system, in accordance with the present invention.

Referring now to FIG. 2, a block diagram of a decoding system 200 is shown, in accordance with one embodiment of the present invention. In alternate embodiments, decoding system 200 may be implemented using components and configurations in addition to, or instead of, certain of those components and configurations discussed in conjunction with the FIG. 2 embodiment. For example, in the FIG. 2 embodiment, decoding system 200 is discussed in the context of processing image data. However, in alternate embodiments, certain concepts and techniques from the present invention may be similarly utilized for processing other types of electronic information.

In the FIG. 2 embodiment, decoding system 200 initially receives encoded data 114 that is provided from one or more data sources in any appropriate encoding format. In the FIG. 2 embodiment, an entropy decoder 202 performs an entropy decoding procedure to effectively convert encoded data 114 into compressed image data 203. In certain embodiments, the entropy decoding procedure increases the bit rate of encoded data 114 by substituting appropriate bit patterns for corresponding codes in the encoded data 114 to produce compressed image data 203 in a YUV format. Various embodiments for implementing and utilizing entropy decoder 202 are further discussed below in conjunction with FIG. 6.

A dequantizer module 204 next performs a dequantization procedure by utilizing appropriate dequantization techniques for decompressing the compressed image data 203 to produce various corresponding tile subbands. For example, in certain embodiments, dequantizer 204 produces the tile subbands by performing dequantization based upon quantization setting of quantizer 111 during encoding. In the FIG. 2 embodiment, an inverse discrete wavelet transform module (inverse DWT) 205 performs a known inverse discrete wavelet transform procedure to reverse a corresponding discrete wavelet transform procedure by converting individual tile subbands into corresponding individual tiles that are output on path 206.

In the FIG. 2 embodiment, a color converter 207 then converts each of the individual tiles from a first color format to a second color format for further processing by decoding system 200. For example, in certain embodiments, the individual tiles received by color converter 207 may be converted from a YUV format into a corresponding RGB format. In the FIG. 2 embodiment, a DC shift circuit 208 next subtracts a predetermined constant DC voltage value from each pixel of the tiles that are output from color converter 207.

In the FIG. 2 embodiment, a frame reconstructor 210 then compares the current frame of image data, on a tile-by-tile basis, with similarly-located comparison tiles from a previous frame 211 of image data to reconstruct the current frame with the total number of tiles that were previously subject to a frame differencing procedure by frame differencing module 104 of FIG. 1. Frame reconstructor 210 then outputs the reconstructed image 212 for utilization by any appropriate entity. Additional frame reconstruction techniques are further discussed below in conjunction with FIG. 4.

Furthermore, in certain alternate embodiments, decoding system 200 is implemented as part of a System-On-Chip (SOC) device in which a CABAC decoder of decoding system 200 is shared by inverse DWT 205 and an H.264 Integer Transform decoding system. The CABAC decoder processes data in an H.264 mode and in an enhanced Discrete Wavelet Transform mode under program control. The CABAC encoder may operate on a wavelet-based tile in Discrete Wavelet Transform mode, and may process a separate video bitstream for the H.264 mode.

In the FIG. 2 embodiment, decoding system 200 is disclosed and discussed as being implemented primarily as hardware circuitry. In certain embodiments, decoding system 200 may be implemented as a single integrated-circuit device. However, in alternate embodiments, some or all of the functions of the present invention may be performed by appropriate software instructions that are executed to effectively perform various functions discussed herein.

Figure 3:
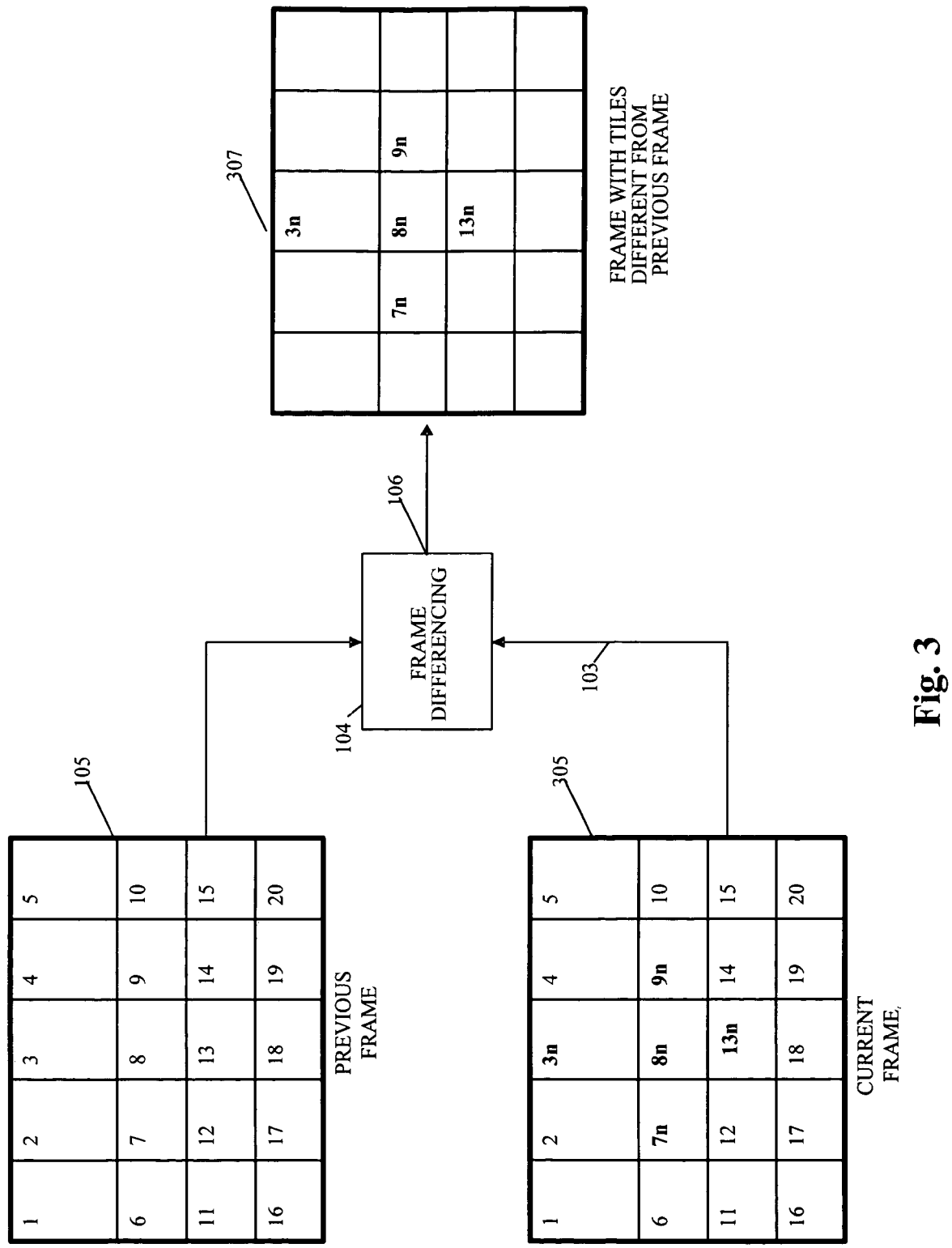
FIG. 3 is a diagram illustrating one embodiment of a frame differencing procedure, in accordance with the present invention.

Referring now to FIG. 3, a diagram illustrating a frame differencing procedure is shown, in accordance with one embodiment of the present invention. The FIG. 3 embodiment is presented for purposes of illustration, and in alternate embodiments, the present invention may readily perform frame differencing procedures using techniques and configurations in addition to, or instead of, certain of those techniques and configurations discussed in conjunction with the FIG. 3 embodiment.

In the FIG. 3 embodiment, frame differencing module 104 stores a previous frame 105 of image data that has been segmented into a series of discrete tiles 1-20 by tiling module 102 (FIG. 1). In the FIG. 3 embodiment, frame differencing module 104 performs the frame differencing procedure using any appropriate techniques for comparing corresponding tiles of previous frame 105 and current frame 305 to determine whether the pixels in any of the compared tiles have been altered.

In the FIG. 3 drawing, for purposes of illustration, altered tiles in current frame 305 are indicated in bold print with the letter "n" following the tile number. For example, in the FIG. 3 embodiment, current frame 305 includes altered tiles 3n, 7n, 8n, 9n, and 13n. Instead of processing all current frames 305, frame differencing module 104 efficiently outputs via path 106 only those altered tiles that are different from corresponding tiles from previous frame 105.

For example, in the FIG. 3 embodiment, frame differencing module 104 outputs an altered frame 307 that is populated only with altered tiles 3n, 7n, 8n, 9n, and 13n. If a current frame 305 exhibits no changed tiles with respect to previous frame 105, then the unaltered current frame 305 is not output by frame differencing module 104. The foregoing frame differencing procedure advantageously supports significantly reduced the processing requirements for encoding system 100 (FIG. 1) and decoding system 200 (FIG. 2). The efficient utilization of frame differencing module 104 by encoding system 100 is further discussed below in conjunction with FIG. 13.

Figure 4:
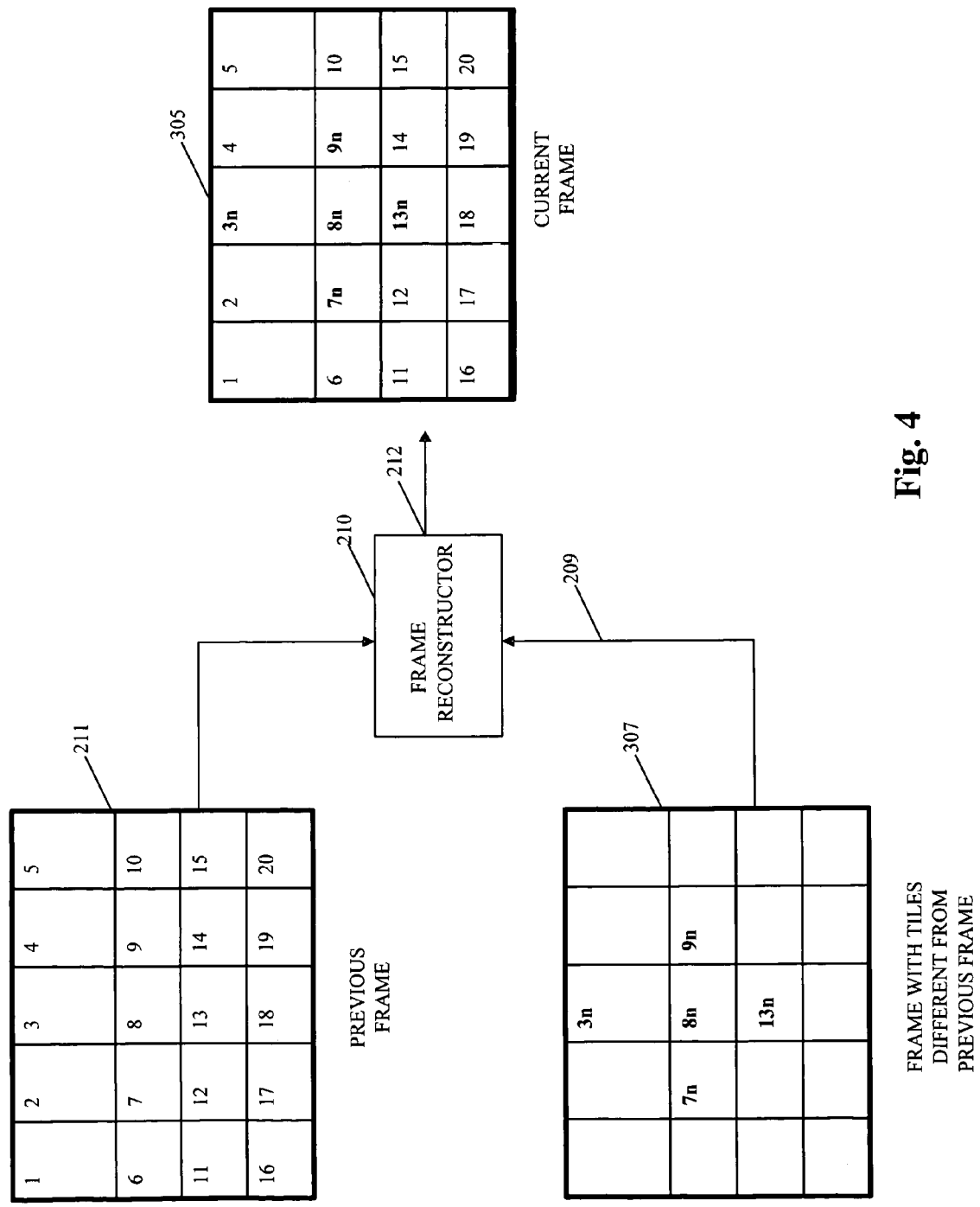
FIG. 4 is a diagram illustrating one embodiment of a frame reconstruction procedure, in accordance with the present invention.

Referring now to FIG. 4, a diagram illustrating a frame reconstruction procedure is shown, in accordance with one embodiment of the present invention. The FIG. 4 embodiment is presented for purposes of illustration, and in alternate embodiments, the present invention may readily perform frame reconstruction procedures using techniques and configurations in addition to, or instead of, certain of those techniques and configurations discussed in conjunction with the FIG. 4 embodiment.

In the FIG. 4 embodiment, frame reconstructor 210 stores a previous frame 211 of image data that is segmented into a series of discrete tiles 1-20. In the FIG. 4 embodiment, frame reconstructor module 210 performs the frame reconstruction procedure using any appropriate techniques for comparing corresponding tiles of previous frame 211 and a received frame 307 to determine whether the pixels in any of the compared tiles have been altered. In the FIG. 4 embodiment, received frame 307 preferably is the same or similar to the "frame with tiles different from previous frame" that is shown as the output of frame differencing module 104 in FIG. 2.

In the FIG. 4 drawing, for purposes of illustration, altered tiles in frame 307 are indicated in bold print with the letter "n" following the tile number.

For example, in the FIG. 4 embodiment, frame 307 includes altered tiles 3n, 7n, 8n, 9n, and 13n. To reverse the frame differencing procedure described in FIG. 3, frame reconstructor 210 utilizes any appropriate techniques to reconstruct the original current frame 305 that was initially processed by frame differencing module 104 in FIG. 3.

For example, in the FIG. 4 embodiment, frame reconstructor 210 outputs a current frame 305 that is populated with both the altered tiles 3n, 7n, 8n, 9n, and 13n from frame 307, and with the remaining unaltered tiles 1-2, 4-6, 10-12, and 14-20 from previous frame 211. The foregoing frame reconstruction procedure thus supports the prior frame differencing procedure of FIG. 3 to advantageously provide significantly reduced processing requirements for encoding system 100 (FIG. 1) and decoding system 200 (FIG. 2).

Figure 5:
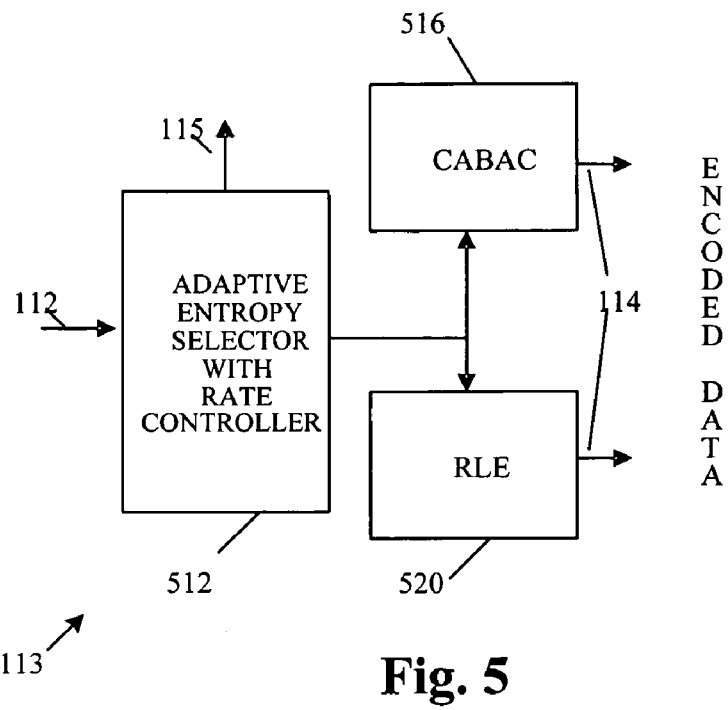
FIG. 5 is a block diagram for one embodiment of the entropy encoder from FIG. 1, in accordance with the present invention.

Referring now to FIG. 5, a block diagram for the FIG. 1 entropy encoder 113 is shown, in accordance with one embodiment of the present invention. In alternate embodiments, entropy encoder 113 may be implemented using components and configurations in addition to, or instead of, certain of those components and configurations discussed in conjunction with the FIG. 5 embodiment.

In the FIG. 5 embodiment, entropy encoder 113 includes an adaptive entropy selector 512 (including a rate controller), a Context-Based Adaptive Binary Arithmetic Coding encoder (CABAC) 516, and a Run-Length Encoding encoder (RLE) 520. In the FIG. 5 embodiment, CABAC encoder 516 may be selected to perform an entropy encoding procedure in accordance with a known H.264 CABAC standard. Further details about the H.264 CABAC encoding process are discussed in "Context-Based Adaptive Binary Arithmetic Coding," by Marpe, Detlev, et al., in the H.264/AVC Video Compression Standard, IEEE Transactions On Circuits And Systems For Video Technology, Vol. 13, No. 7, July 2003.

In the FIG. 5 embodiment, entropy encoder 113 may alternately select and activate RLE encoder 520 to perform entropy encoding procedures in accordance with certain known run-length encoding techniques. Further details about various types of run-length encoding techniques may be found and reviewed on-line at the following Internet web page address: http://en.wikipedia.org/wiki/Run-length_encoding.

In the FIG. 5 embodiment, CABAC encoder 516 is typically implemented as one or more hardware circuits, while RLE encoder 520 is typically implemented to perform entropy encoding procedures in response to the execution of entropy encoding software instructions. In the FIG. 5 embodiment, CABAC encoder 516 typically performs entropy encoding with relatively low transmission bandwidth and memory requirements as compared with transmission bandwidth and memory requirements of RLE encoder 520. In the FIG. 5 embodiment, CABAC encoder 516 typically also achieves a greater amount of compression than RLE encoder 520 when performing entropy encoding. However, CABAC encoder 516 is typically more expensive to implement than RLE encoder 520.

In the FIG. 5 embodiment, adaptive entropy selector 512 initially receives compressed data 112 from quantizer 111 of FIG. 1. In the FIG. 5 embodiment, adaptive entropy selector 512 dynamically senses current available transmission bandwidth and memory resources for entropy encoder 113. Because certain versions of encoding system 100 and/or decoding system 200 may not support CABAC encoding and/or decoding, adaptive entropy selector 512 also determines whether CABAC encoders/decoders are available for performing corresponding entropy encoding and/or decoding processes.

In the FIG. 5 embodiment, based upon the foregoing different encoding selection criteria, adaptive entropy selector 512 is configured to flexibly and dynamically select either CABAC encoder 516 or RLE encoder 520 to perform the current entropy encoding procedure. For example, if available transmission bandwidth and memory resources are relatively low, adaptive entropy selector 512 may select CABAC encoder 516. Similarly, if a higher degree of compression is required, adaptive entropy selector 512 may select CABAC encoder 516. Alternately, if CABAC encoding is not currently supported, adaptive entropy selector 512 may select RLE encoder 520. Similarly, if transmission bandwidth and memory resources are abundant, then adaptive entropy selector 512 may consider selecting RLE encoder 520 for performing the entropy encoding process.

In the FIG. 5 embodiment, adaptive entropy selector 512 includes a rate controller that adjusts and provides an adaptive quantization parameter 115 via a feedback loop to quantizer 111 (FIG. 1) to produce compressed image data 112 by altering the bit rate of compressed image data 112 according to a particular compression ratio that is specified by the adaptive quantization parameter 115. In the FIG. 5 embodiment, the rate controller of adaptive entropy selector 512 determines picture quality characteristics of encoded data 114 by utilizing any appropriate criteria or techniques.

The rate controller of adaptive entropy selector 512 may then adjust adaptive quantization parameter 115 to decrease the amount of compression if encoded data 114 exhibits unacceptable picture quality, or if bandwidth characteristics of the downstream channel are insufficient. Conversely, the rate controller may adjust adaptive quantization parameter 115 to increase the amount of compression if the picture quality of encoded data 114 is not particularly critical. In addition, the rate controller may adjust adaptive quantization parameter 115 to decrease the amount of compression in compressed image data 112 when available memory and/or transmission bandwidth becomes relatively scarce. Conversely, the rate controller may adjust adaptive quantization parameter 115 to increase compression levels of compressed image data 112 when available memory and/or transmission bandwidth is plentiful and improved picture quality would be beneficial. Additional techniques for effectively utilizing entropy encoder 113 are further discussed below in conjunction with FIGS. 11 and 13.

Figure 6:
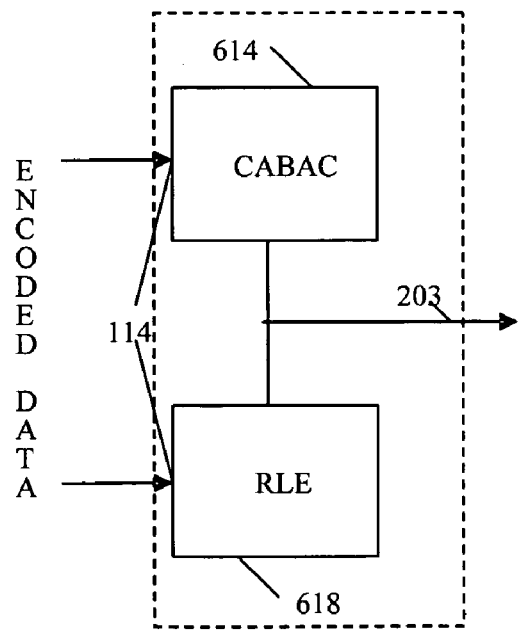
FIG. 6 is a block diagram for one embodiment of the entropy decoder from FIG. 2, in accordance with the present invention.

Referring now to FIG. 6, a block diagram for the FIG. 2 entropy decoder 202 is shown, in accordance with one embodiment of the present invention. In alternate embodiments, entropy decoder 202 may be implemented using components and configurations in addition to, or instead of, certain of those components and configurations discussed in conjunction with the FIG. 6 embodiment.

In the FIG. 6 embodiment, entropy decoder 202 includes a CABAC decoder 614 and an RLE decoder 618. In the FIG. 6 embodiment, CABAC decoder 614 may be selected to perform known entropy decoding procedures to effectively reverse the entropy encoding procedure performed by CABAC encoder 516 of FIG. 5. In certain embodiments, CABAC decoder 614 may be selected to perform an entropy decoding procedure in accordance with a known H.264 CABAC standard that is discussed above in conjunction with FIG. 5.

Alternately, RLE decoder 520 may be selected to perform known entropy decoding procedures to effectively reverse the entropy encoding procedure performed by RLE encoder 520 of FIG. 5. In certain embodiments, entropy decoder 202 may dynamically and flexibly select RLE decoder 618 to perform appropriate entropy decoding procedures in accordance with various known run-length decoding standards that are discussed above in conjunction with RLE encoder 520 of FIG. 5.

In the FIG. 6 embodiment, entropy encoder 202 initially receives encoded data 114 from any appropriate data source. In response, entropy encoder 202 analyzes encoded data 114 to determine whether encoded data 114 is configured in a CABAC-encoded format or in an RLE-encoded format. In the FIG. 6 embodiment, entropy encoder 202 then activates either CABAC decoder 614 or RLE decoder 618 to perform an entropy decoder procedure, depending upon the type of encoding format of the encoded data 114.

For example, if encoded data 114 is received in a CABAC-encoded format, then entropy decoder 202 utilizes CABAC decoder 614 to decode encoded data 114 to provide corresponding compressed image data 203 to dequantizer 204 (FIG. 2). Alternately, if encoded data 114 is received in an RLE-encoded format, then entropy decoder 202 utilizes RLE decoder 520 to decode encoded data 114 to provide corresponding compressed image data 203 to dequantizer 204. Additional techniques for utilizing entropy decoder 202 are further discussed below in conjunction with FIG. 12.

Figure 7:
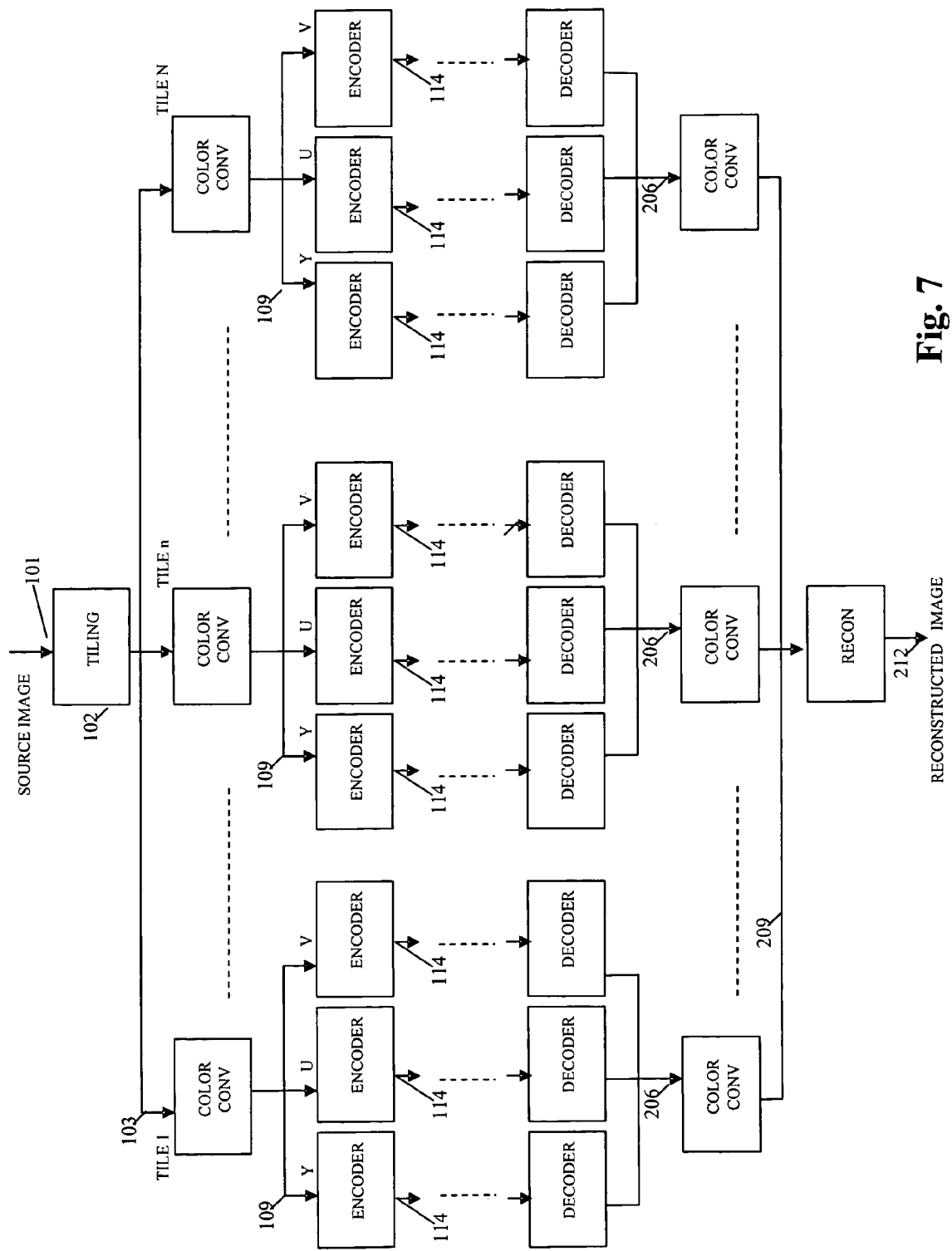
FIG. 7 is a block diagram for one embodiment of a multiple encoder-decoder architecture, in accordance with the present invention.

Referring now to FIG. 7, a block diagram for a multiple encoder-decoder architecture is shown, in accordance with one embodiment of the present invention. The FIG. 7 embodiment is presented for purposes of illustration, and in alternate embodiments, multiple encoder-decoder architectures may be implemented using components and configurations in addition to, or instead of, certain of those components and configurations discussed in conjunction with the FIG. 7 embodiment.

In the FIG. 7 embodiment, a tiling module 102 initially receives a source image 101 as a frame of image data from any appropriate data source. Tiling module 102 then divides source image 101 into individual tiles that are preferably implemented as contiguous sections of image data from source image 101. In the FIG. 7 embodiment, the individual tiles 103 are each sent to one of a series of different color converters that each convert respective received tiles from a first color format to a second color format. For example, in certain embodiments, source image 101 may initially be received in an RGB format which the color converters responsively convert into corresponding YUV components 109 on a tile-by-tile basis.

In the FIG. 7 embodiment, a series of encoders are shown configured in parallel to concurrently encode the YUV components 109. These encoders may be implemented in any appropriate manner. For example, in certain embodiments, each of the encoders may be implemented to include DWT 110, quantizer 111, and entropy encoder 113 from the FIG. 1 embodiment of encoding system 100. In the FIG. 7 embodiment, each of the YUV components 109 are separately provided to a different one of the parallel encoders for concurrent encoding to significantly improve throughput characteristics of the encoding process. Each of the YUV components 109 may then be concurrently output from a respective one of the parallel encoders as encoded data 114.

In the FIG. 7 embodiment, a series of decoders are shown configured in parallel to concurrently decode respective components of encoded data 114. These decoders may be implemented in any appropriate manner. For example, in certain embodiments, each of the parallel decoders may be implemented to include entropy decoder 202, dequantizer 204, and inverse DWT 205 from the FIG. 2 embodiment of decoding system 200. In the FIG. 7 embodiment, each of the components of encoded data 114 are separately provided to a different one of the parallel decoders for concurrent decoding to significantly improve throughput characteristics of the decoding process.

Each of decoders may then concurrently output a respective one of the decoded YUV components 206 to a corresponding color converter which converts and combines the YUV components 206 into a composite image (such as a composite RGB image). In the FIG. 7 embodiment, a frame reconstructor (RECON) may then provide a reconstructed image 212 to any appropriate image destination.

In the FIG. 7 embodiment, the multiple encoder/decoder architecture is shown with a matching number of encoders and decoders. However, in alternate embodiments, encoder/decoder architectures are also contemplated with non-matching numbers of encoders and decoders. For example, a server computer may require a larger number to encoders to efficiently process a large amount of data for use by separate client computers that each require a relatively reduced numbers of decoders.

In addition, multiple encoder/decoder architectures may similarly be utilized to separately encode and/or decode individual images in a parallel manner for utilization by different data destinations. Furthermore, in certain embodiments, an individual encoder or decoder may be implemented with a plurality of entropy encoders that are configured in parallel to support a single encoding system. For example, the encoding system 100 of FIG. 1 and/or the decoding system 200 of FIG. 2 may be implemented with a plurality of appropriate CABAC encoders 516 or CABAC decoders 614 configured in parallel so that other system components need not wait in an idle state for completion of lengthy entropy encoding or decoding procedures.

Figure 8:
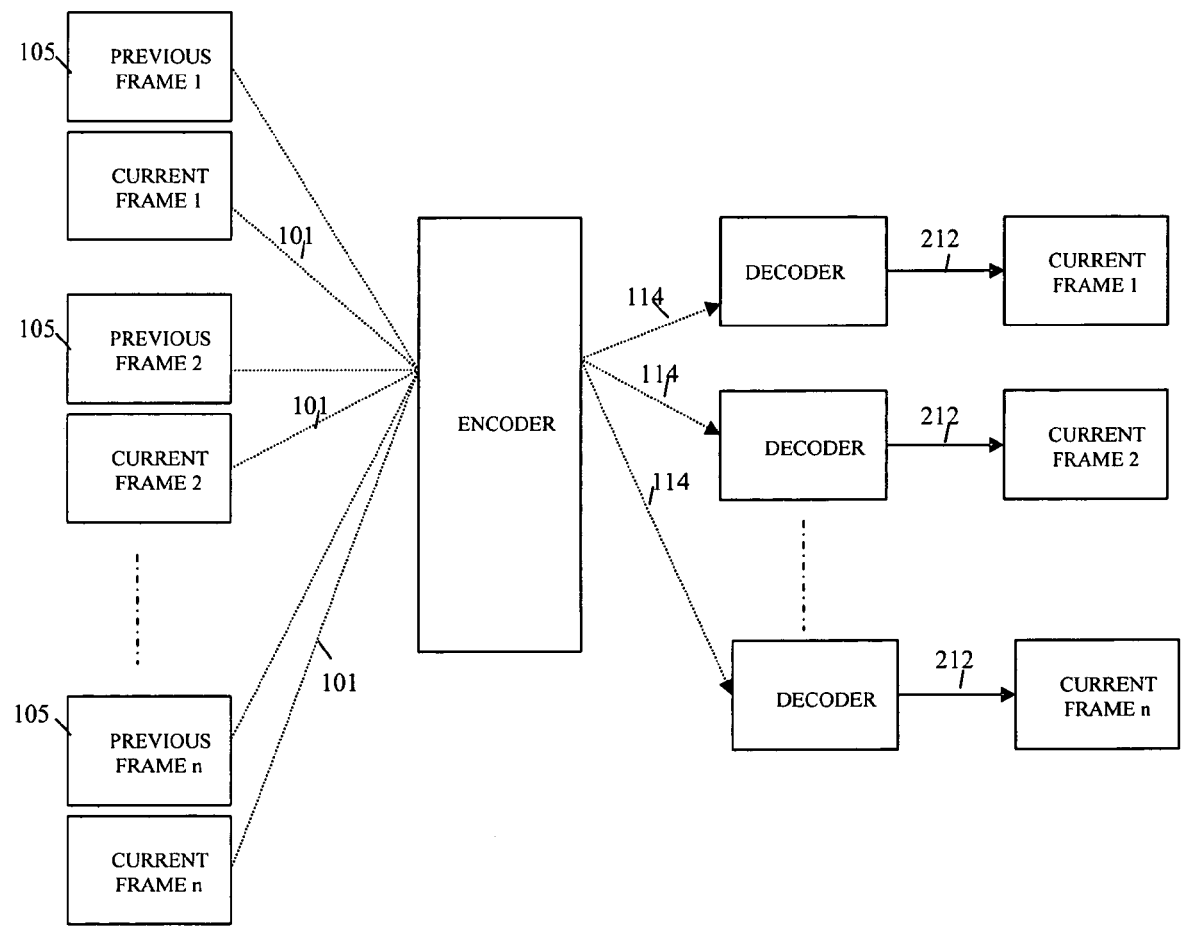
FIG. 8 is a block diagram for one embodiment of a multiple image encoding/decoding procedure, in accordance with the present invention.

Referring now to FIG. 8, a block diagram illustrating a multiple image encoding/decoding procedure is shown, in accordance with one embodiment of the present invention. The FIG. 8 embodiment is presented for purposes of illustration, and in alternate embodiments, the present invention may perform multiple image encoding/decoding procedures using techniques and configurations in addition to, or instead of, certain of those techniques and configurations discussed in conjunction with the FIG. 8 embodiment.

In the FIG. 8 embodiment, a single encoder is shown concurrently encoding an image 1 through an image n, and providing the respective encoded images to appropriate decoders. In the FIG. 8 embodiment, the encoder may be implemented in any effective manner. For example, in certain embodiments, the FIG. 8 encoder may include, but is not limited to, any of the components shown in the encoding system 100 of FIG. 1.

In the FIG. 8 embodiment, the encoder stores previous frames 1 through n (105) from respective corresponding images. The FIG. 8 encoder also receives current frames 1 through n of source images 101 from any appropriate destination(s). The FIG. 8 encoder then concurrently processes the current frames 101 using any appropriate techniques to generate corresponding encoded data 114. For example, in certain embodiments, the FIG. 8 encoder utilizes encoding techniques that are the same as, or similar to, those encoding techniques discussed above in conjunction with FIGS. 1, 3, and 5.

In the FIG. 8 embodiment, the encoder then provides the individual frames of encoded data 114 to respective decoders that are configured in parallel to concurrently decode corresponding frames of encoded data 114. These decoders may be implemented in any appropriate manner. For example, in certain embodiments, the FIG. 8 decoders may each include, but are not limited to, any of the components shown in decoding system 200 of FIG. 2.

The FIG. 8 decoders then concurrently process the encoded data 114 using any appropriate techniques to generate corresponding current frames 1 through n of reconstructed images 212. For example, in certain embodiments, the FIG. 8 decoders utilize decoding techniques that are the same as, or similar to, those decoding techniques discussed above in conjunction with FIGS. 2, 4, and 6. In the FIG. 8 embodiment, the reconstructed images 212 may then be provided to any appropriate image destination.

Figure 9:
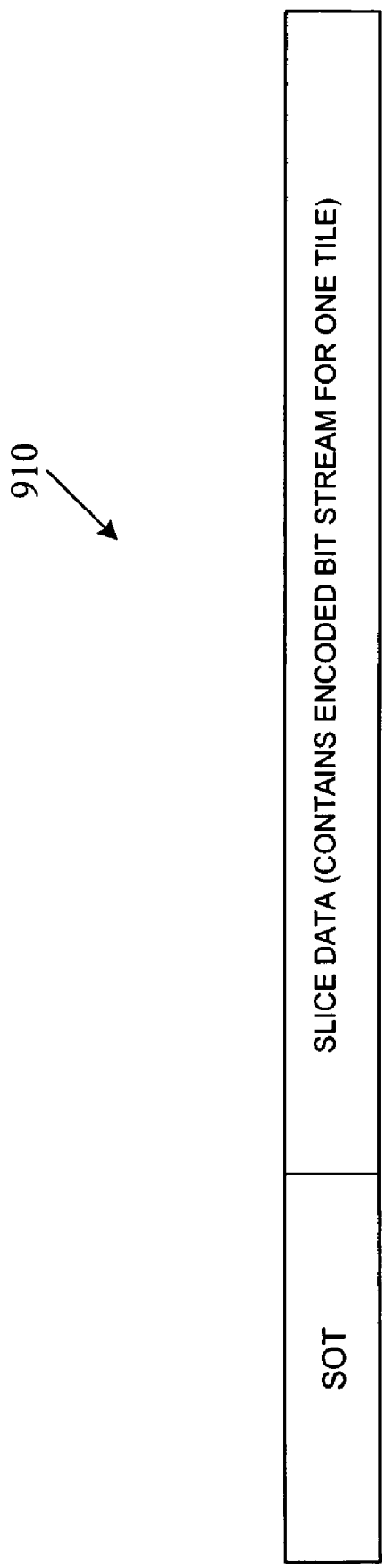
FIG. 9 is a diagram for one embodiment of tile data, in accordance with the present invention.

Referring now to FIG. 9, a diagram for tile data 910 is shown, in accordance with one embodiment of the present invention. In the FIG. 9 embodiment, tile data 910 includes a Start Of Tile (SOT) header and slice data. The FIG. 9 embodiment is presented for purposes of illustration, and in alternate embodiments, tile data 910 may be implemented using components and configurations in addition to, or instead of, certain of those components and configurations discussed in conjunction with the FIG. 9 embodiment.

The FIG. 9 embodiment illustrates the data format for storing or transmitting encoded data 114 for each tile. The start of tile header (SOT) consists of various different selectable parameters that are used to reconstruct the tile and embed the tile into to a current frame of image data. For example the SOT may include quantization parameters for various sub-bands, a length of an associated encoded information, and offset values to facilitate decoding procedures. The SOT is followed by the slice data that includes an encoded bit stream corresponding to one associated tile. In the FIG. 9 embodiment, the slice data may be encoded in any appropriate format. For example, in certain embodiments, slice data may be encoded either by the CABAC encoder 516 or by the RLE encoder 520 discussed above in conjunction with FIG. 5.

Referring now to FIGS. 10A-B, diagrams illustrating certain techniques for performing a CABAC configuration procedure are shown, in accordance with certain embodiments of the present invention. The embodiments of FIGS. 10A-B are presented for purposes of illustration, and in alternate embodiments, the present invention may perform CABAC configuration procedures using techniques and configurations in addition to, or instead of, certain of those techniques and configurations discussed in conjunction with the embodiments shown in FIGS. 10A-B.

In certain embodiments, the present invention advantageously configures (retrofits) a standard CABAC encoder to accommodate the invention's particular data format of individual data tiles. Input data is formatted to be successfully processed by a standard commercially-available CABAC engine, even though the input format is different from the standard data format for which the CABAC encoder is typically utilized. The present invention therefore modifies the usual configuration of standard CABAC engines for more effective and flexible use in their particular application.

Due to the CABAC configuration procedure, the present invention is able to call and process macroblocks of data from the tiles by utilizing the CABAC encoder. In certain embodiments, tiles are typically 128×128 pixels, whereas CABAC engines typically process macroblocks of 16×16 pixels from corresponding complete frames. The present invention configures the CABAC engine to retrofit their tile data into the CABAC environment by treating a tile like a CABAC frame, and dividing the tile into 16×16 macroblocks.

CABAC encoder also typically process Y, U, and V components together, while the present invention provides the YUV components to a CABAC encoder as separate entities for individual processing. The present invention therefore manipulates the input data to allow CABAC encoders to successfully process the non-standard input data, even though the data format is significantly different from the standard CABAC input data format.

FIG. 10A is partial algorithm for a standard configuration of an H.264 CABAC engine. Coded-block pattern 1014 specifies how many types of different color components (YUV) are processed concurrently. In accordance with the present invention, coded-block pattern 1014 may be selected to allow processing YUV components separately. MB type 1012 specifies the types of macroblocks to be processed. In accordance with the present invention, only I frames may selected (no P or B frames).

FIG. 10B shows a preferred set of CABAC configuration parameters, in accordance with one embodiment of the present invention. Sequence header parameters 1050 are configuration parameters for groups of frames of input data, and picture header parameters 1052 are configuration parameters for individual frames of input data. Similarly, slice header parameters 1054 are configuration parameters for individual tiles of input data, and macroblock header parameters are configuration parameters for individual macroblocks (for example, block of 16×16 pixels) from the tiles.

The FIG. 10A flowchart for the H.264 CABAC encoding algorithm is typically used to encode video data (such as quantized coefficients, motion vectors, type of frames, etc.) using specific types and options that are particular to video formats. In order to use the same algorithm for encoding image data, the operating parameters may be configured in a special and unique manner while still utilizing the H.264 CABAC encoding algorithm.

In the FIG. 10B embodiment, information about the tiles (such as the quantized coefficients, size of the tile, quantization parameter, etc.) is encoded (while still using the H.264 CABAC algorithm) by selecting particular paths and definitions. Each tile is considered to be a slice. All of the sub-bands of a given tile are grouped together to form an image of the same size as that of the corresponding tile. This group of sub-bands is then divided into macroblocks to be compatible with the CABAC encoding algorithm.

In the FIG. 10B embodiment, all of the macroblocks are coded as Intrablocks by setting mb_type 1058 to be equal to either Intra_16×16 or Intra_4×4. In order to improve the compression characteristics, the intra_chroma_pred_mode may be selected to be zero. The color components YUV are encoded separately by defining the coded_block_pattern 1060 for each component to be 0xF and/or by selecting an appropriate profile ID in the sequence header parameter 1050. The foregoing configuration steps facilitate decoding the color components YUV separately if required.

Figure 11:
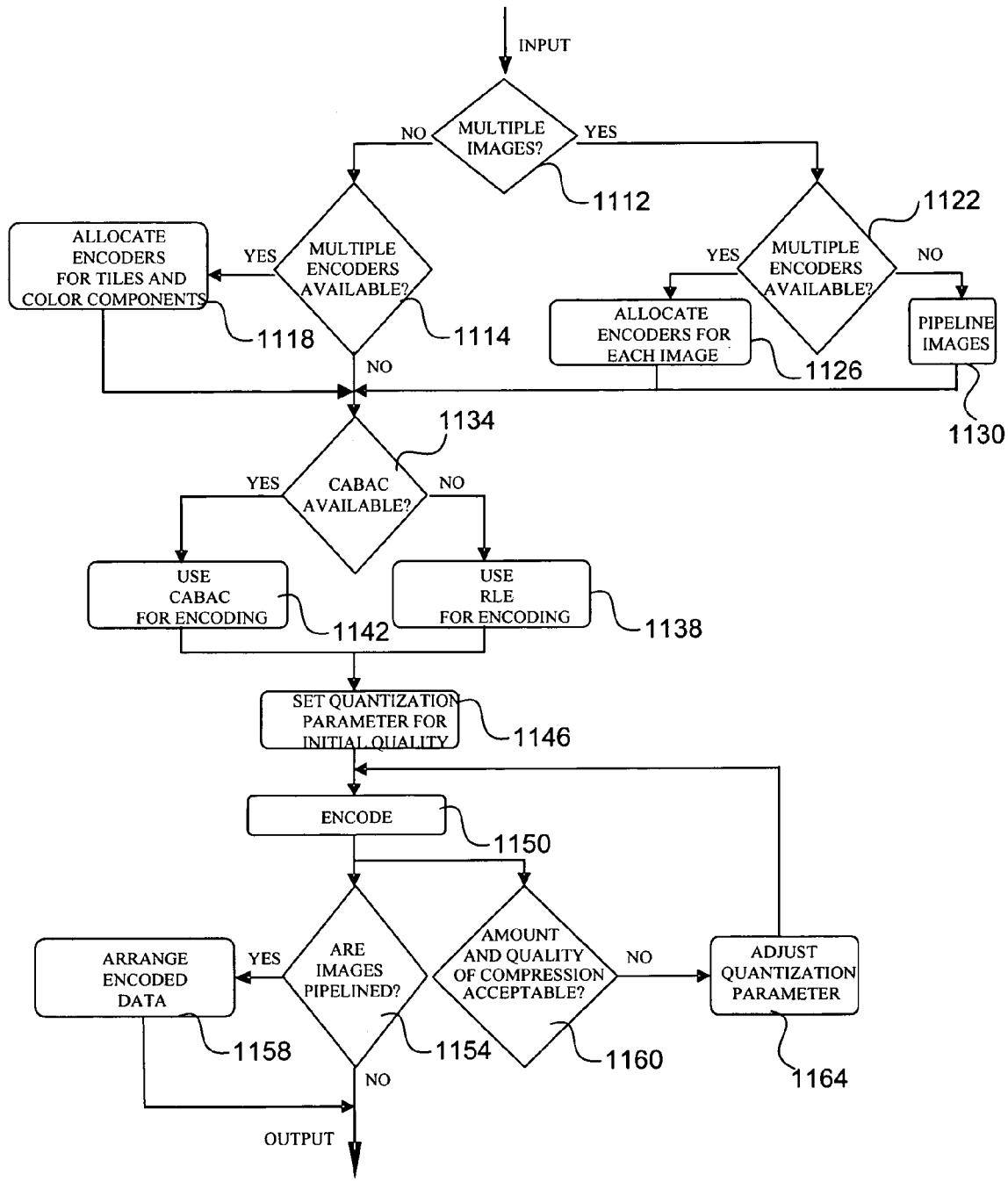
FIG. 11 is a flowchart of method steps for performing an encoding procedure, in accordance with one embodiment of the present invention.

Referring now to FIG. 11, a flowchart of method steps for performing an encoding procedure is shown, in accordance with one embodiment of the present invention. The FIG. 11 example is presented for purposes of illustration, and in alternate embodiments, the present invention may readily utilize steps and sequences other than certain of those steps and sequences discussed in conjunction with the FIG. 11 embodiment.

In the FIG. 11 embodiment, in step 1112, an encoding system 100 initial receives input data, and responsively determines whether the input data includes multiple images. If only a single image source is being received, then in step 1114, encoding system 100 determines whether multiple encoders are available for processing the image. If multiple encoders are available, then in step 1118, encoding system 100 allocates the encoders to separately and concurrently process the individual tiles of the different color components in a parallel manner.

Alternately, if multiple images are received, then in step 1122, encoding system 100 determines whether multiple encoders are available for processing the images. If multiple encoders are available, then in step 1126, encoding system 100 allocates the encoders to separately and concurrently process the multiple images in a parallel manner. If multiple encoders are not available, then in step 1130, encoding system 100 performs a pipelining procedure for passing the multiple images through the encoding process.

In the FIG. 11 embodiment, in step 1134, encoding system 100 determines whether CABAC encoding/decoding is supported. If a CABAC encoding/decoding is available, then in step 1142, encoding system 100 utilizes the CABAC encoder 516 to perform the entropy encoding procedure. However, if a CABAC encoding/decoding is not available, then in step 1138, encoding system 100 utilizes a RLE encoder 520 to perform the entropy encoding procedure.

In the FIG. 11 embodiment, in step 1146, encoding system 100 sets a quantization parameter at an initial image quality level that corresponds to a particular compression ratio 115 of a quantizer 111 (FIG. 1). Then, in step 1150, encoding system 100 encodes the image(s) in a pre-determined encoding format. In step 1154, encoding system 100 determines whether the images are pipelined. If the images are not pipelined, then encoding system 100 outputs the encoded data 114 to an appropriate data destination. Alternately, if the images are pipelined, in step 1158, encoding system 100 arranges the encoded data 1158 before outputting the encoded data 114 to an appropriate data destination.

In the FIG. 11 embodiment, in step 1160, encoding system 100 determines whether the compression amount and quality of the output images are acceptable. If the amount and quality of compression are not acceptable according to pre-defined criteria, then in step 1164, encoding system 100 dynamically utilizes a feedback loop to adjust the quantization parameter 115 for altering the compression ratio of quantizer 111 to thereby change the amount and quality of the encoding compression.

Figure 12:
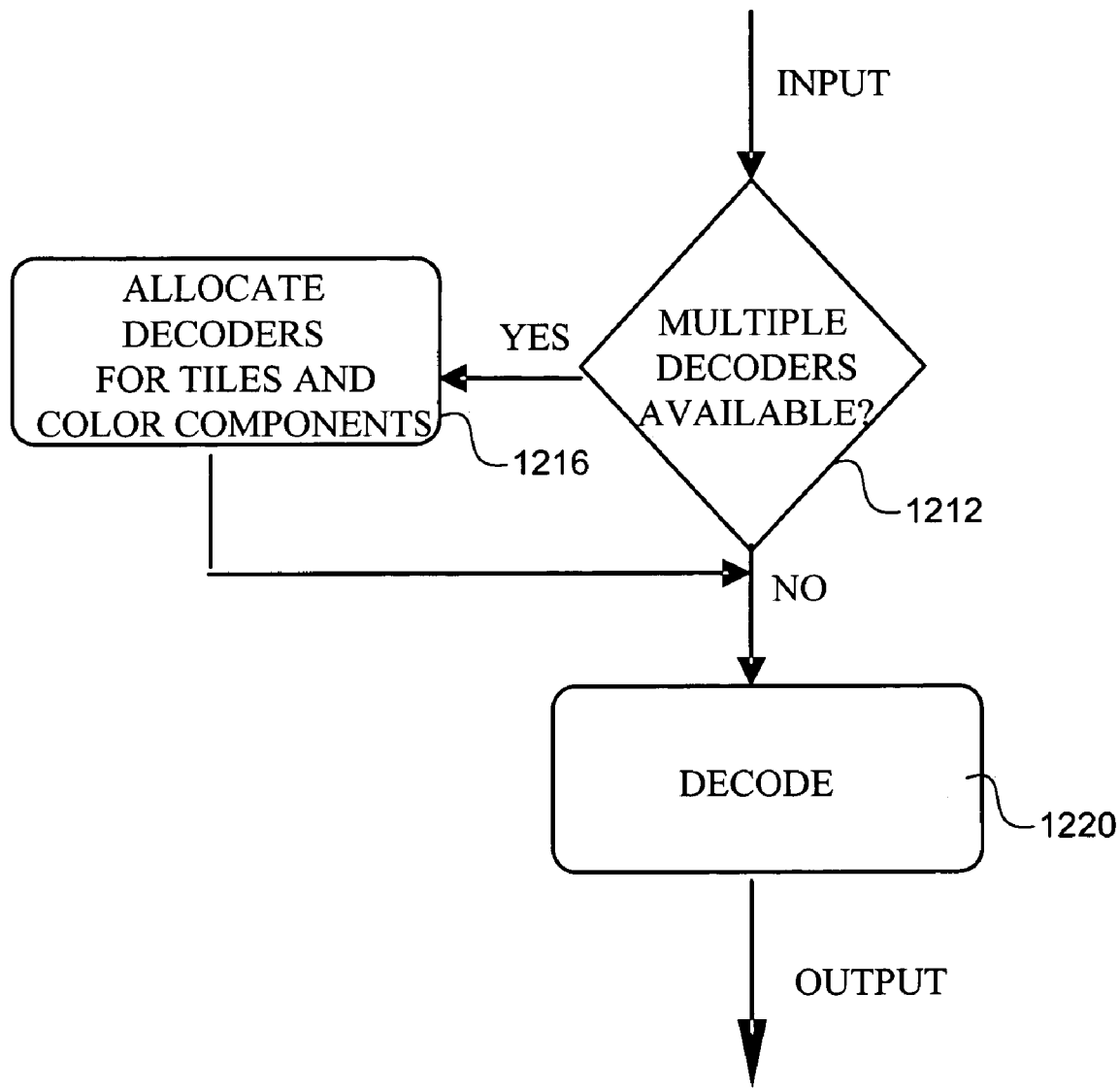
FIG. 12 is a flowchart of method steps for performing a decoding procedure, in accordance with one embodiment of the present invention.

Referring now to FIG. 12, a flowchart of method steps for performing a decoding procedure is shown, in accordance with one embodiment of the present invention. The FIG. 12 example is presented for purposes of illustration, and in alternate embodiments, the present invention may readily utilize steps and sequences other than certain of those steps and sequences discussed in conjunction with the FIG. 12 embodiment.

In the FIG. 12 embodiment, a decoding system 200 initially receives input data in the form of encoded data 114. Then in step 1212, decoding system 200 determines whether multiple decoders are available for processing the encoded data 114. If multiple encoders are available, then in step 1216, decoding system 200 allocates the decoders to separately and concurrently process the individual tiles of the different color components in a parallel manner. In the FIG. 12 embodiment, in step 1220, decoding system 200 next decodes the image data in a pre-determined manner to produce a reconstructed image 212. Decoding system 200 then outputs the reconstructed image 212 to any appropriate data destination(s).

Figure 13:
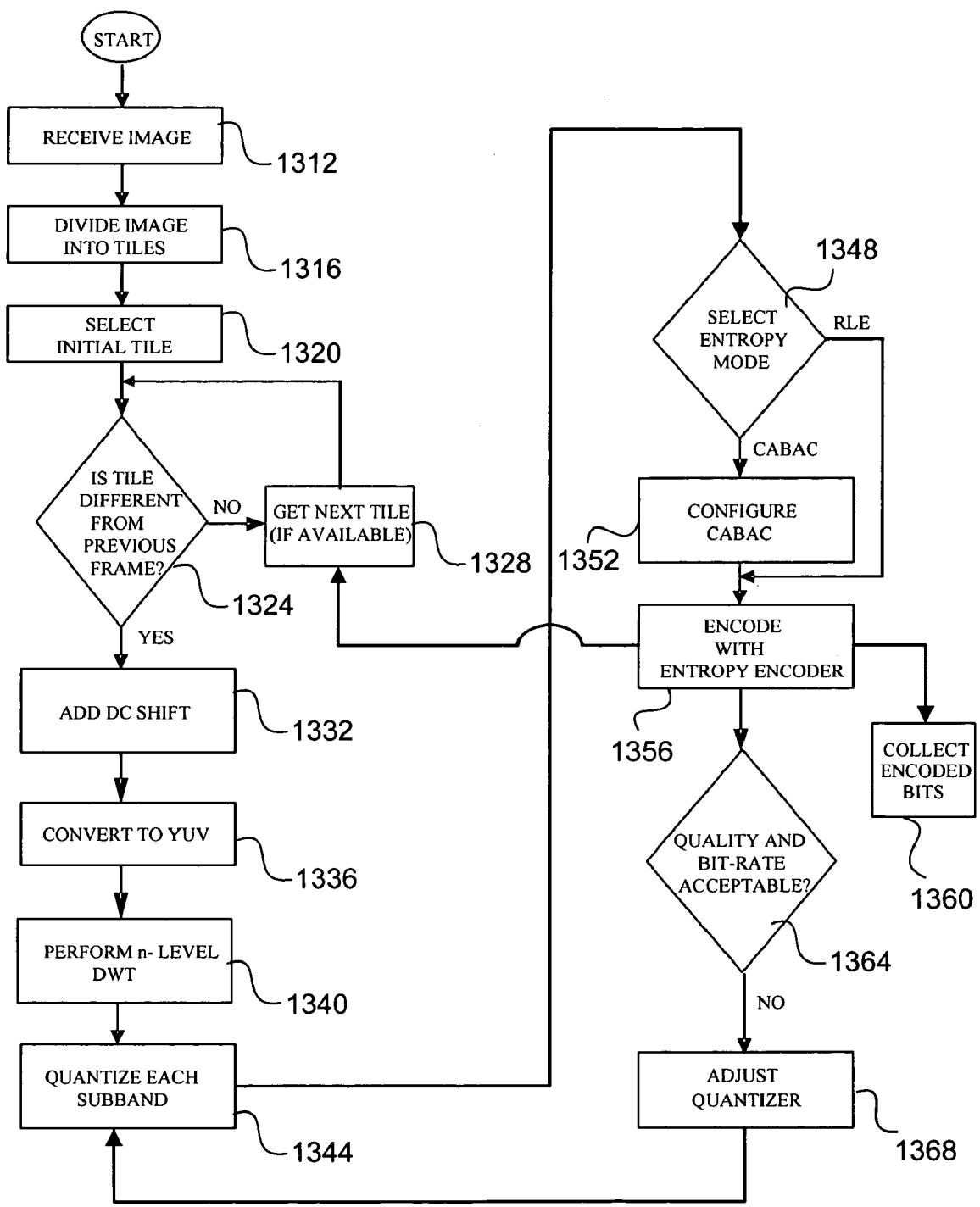
FIG. 13 is a flowchart of method steps for performing an encoding procedure, in accordance with another embodiment of the present invention.

Referring now to FIG. 13, a flowchart of method steps for performing an encoding procedure is shown, in accordance with one embodiment of the present invention. The FIG. 13 example is presented for purposes of illustration, and in alternate embodiments, the present invention may readily utilize steps and sequences other than certain of those steps and sequences discussed in conjunction with the FIG. 13 embodiment.

In the FIG. 13 embodiment, in step 1312, an encoding system 100 initially receives a source image 101 from any appropriate data source. The source image 101 may be configured according to any desired data format. For example, in certain embodiments, the source image 101 may be implemented as an array of digital picture elements (pixels) in a known RGB format. In step 1316, encoding system 100 utilizes a tiling module 102 to divide the source image 101 into individual tiles that are implemented as contiguous sections of image data from the source image 101.

In step 1320, encoding system 100 selects a current tile from the source image 101. Then in step 1324, a frame differencing module 104 compares the current tile to a corresponding comparison tile from a previous frame 105 to determine whether the current tile has been altered with respect to the comparison tile from the immediately preceding frame 105. If the pixels in the current tile have not been altered, then frame differencing module 104 does not output the current tile. Instead, in step 1328, frame differencing module 104 accesses the next tile (if available) from source image 101, and the FIG. 13 process returns to repeat foregoing step 1324.

However, in step 1324, if one or more pixels in the current tile have been altered, then frame differencing module 104 outputs the corresponding tile to a DC shift module 107 that adds a constant DC voltage value to each pixel from the tiles that are output from frame differencing module 104. In step 1336, a color converter 108 converts each of the altered tiles from a first color format to a second color format that is appropriate for further processing by encoding system 100. For example, in certain embodiments, source image 101 may initially be received in an RGB format which color converter 108 responsively converts into a corresponding YUV format.

In the FIG. 13 embodiment, a discrete wavelet transform module (DWT) 110 performs a known discrete wavelet transform procedure (DWT) to transform the individual color components of the tiles into corresponding color subbands. A quantizer module 111 next performs a quantization procedure by utilizing appropriate quantization techniques to compress the color subbands. In the FIG. 13 embodiment, quantizer 111 produces compressed image data 112 by reducing the bit rate of the color subbands according to a particular compression ratio that is specified by an adaptive quantization parameter 115.

In the FIG. 13 embodiment, in step 1348, an adaptive entropy selector 512 next selects an appropriate entropy mode (either CABAC mode or RLE mode) for performing an entropy encoding procedure based upon certain pre-determined encoding mode selection criteria. If CABAC mode is selected, then in step 1352, encoding system 100 advantageously performs a CABAC configuration procedure that defines certain specific configuration parameters for operating a CABAC encoder 516 to optimally process the compressing image data 112 received from quantizer 111.

In the FIG. 13 embodiment, in step 1356, an entropy encoder 113 performs an entropy encoding procedure upon the compressed data 112 by utilizing the entropy mode (either CABAC mode or RLE mode) that was selected in foregoing step 1348. In step 1360, encoding system 100 may then collect the encoded data 114 for providing to any appropriate data destination(s). At this point, the FIG. 13 process may be repeated for additional tiles by returning to step 1328, where frame differencing module 104 accesses the next tile from source image 101 (if any unprocessed tiles remain).

In the FIG. 13 embodiment, in step 1364, encoding system 100 may further perform a bit-rate control procedure by initially determining whether the quality and bit-rate of encoded data 114 are acceptable in light of one or more pre-defined image assessment criteria. In step 1364, if encoding system 100 determines that the quality and bit-rate of encoded data 114 are not acceptable, then in step 1368, a bit rate controller of entropy encoder 113 provides an adaptive quantization parameter 115 via a feedback loop to quantizer 111 to alter the bit rate of compressed image data 112 according to a particular compression ratio that is specified by the adaptive quantization parameter 115. The present invention thus provides an improved system and method for effectively encoding and decoding electronic information.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for utilizing an encoding system to process electronic information, comprising:
    input means configured to receive source data from a data source;
    a tiling module coupled to said input means for dividing said source data into data tiles;
    processing means coupled to said tiling module for processing said data tiles into tile components; and
    encoding means configured to encode said tile components into encoded data, said encoding means selecting an encoding mode based upon pre-determined mode selection criteria to thereby perform a data encoding procedure.

2. The system of claim 1 wherein said source data from said data source includes image data that is configured in a digital image data format.

3. The system of claim 2 wherein said data tiles are implemented as a group of contiguous pixel segments of said source data.

4. The system of claim 1 wherein said processing means includes a frame differencing module that compares current data tiles from a current frame of said source data with similarly-located comparison tiles form a previous frame of said source data.

5. The system of claim 4 wherein said frame differencing module reduces a total number of tiles that require encoding by outputting only altered tiles from said current frame that are different from said similarly-located comparison tiles from said previous frame of said source data.

6. The system of claim 5 wherein a frame reconstructor of a decoding system performs a frame reconstruction procedure to regenerate a current decoded frame that is populated with said altered tiles and with remaining unaltered tiles from a prior frame of decoded data.

7. The system of claim 1 wherein a DC shift module adds a constant DC voltage value to each pixel from said data tiles that are output from said tiling module.

8. The system of claim 1 wherein a color converter converts each of said data tiles from a first color format to said tile components in a second color format.

9. The system of claim 8 wherein said color converter converts each of said data tiles from an RGB format into said tile components in a YUV format.

10. The system of claim 1 wherein said source data includes multiple images, said encoding means including multiple encoders configured in a substantially parallel configuration, said encoding means allocating said multiple encoders to process respective ones of said multiple images, said multiple encoders concurrently processing said multiple images in a substantially parallel manner.

11. The system of claim 1 wherein said encoding means including multiple encoders configured in a substantially parallel configuration, said encoding means allocating said multiple encoders to process respective ones of said data tiles, said multiple encoders concurrently processing said respective ones of said data tiles in a substantially parallel manner.

12. The system of claim 11 further comprising decoding means that includes multiple decoders configured in a substantially parallel configuration, said decoding means allocating said multiple decoders to process respective ones of said data tiles, said multiple decoders concurrently processing said respective ones of said data tiles in a substantially parallel manner.

13. The system of claim 1 wherein said source data includes multiple images, said encoding means including a single encoder that concurrently processes said multiple images to generate encoded images, said single encoder providing each of said encoded images to a different respective one of multiple decoders for performing corresponding data decoding procedures.

14. The system of claim 1 wherein a discrete wavelet transform module performs a discrete wavelet transform procedure to transform said tile components into corresponding tile subbands.

15. The system of claim 14 wherein a quantizer module performs a quantization procedure to compress said tile subbands into compressed data by reducing a compression bit rate according to a compression ratio that is specified by an adaptive quantization parameter.

16. The system of claim 1 wherein said encoding means comprises an entropy encoder that includes a high-bandwidth encoder and a low-bandwidth encoder, said high-bandwidth encoder have greater transmission bandwidth requirements than said low-bandwidth encoder.

17. The system of claim 16 wherein said high-bandwidth encoder includes a Context-Based Adaptive Binary Arithmetic Coding encoder that is implemented primarily as hardware circuitry according to a H.264/AVC Video Compression Standard.

18. The system of claim 16 wherein said low-bandwidth encoder includes a Run-Length Encoding system that is implemented primarily as executable software instructions.

19. The system of claim 16 wherein said entropy encoder includes an adaptive entropy selector that monitors available transmission bandwidth for said entropy encoder, said adaptive entropy selector dynamically selecting between said high-bandwidth encoder and said low-bandwidth encoder based upon a current amount of said available transmission bandwidth.

20. The system of claim 16 wherein said entropy encoder includes an adaptive entropy selector that determines whether said high-bandwidth encoder is supported in associated encoding and decoding systems, said adaptive entropy selector dynamically selecting said low-bandwidth encoder if said high-bandwidth encoder is not supported in said associated encoding and decoding systems.

21. The system of claim 16 further comprising a decoding system that comprises an entropy decoder that includes a high-bandwidth decoder and a low-bandwidth decoder, said entropy decoder dynamically selecting between said high-bandwidth decoder and said low-bandwidth encoder based upon an corresponding encoding format of said encoded data.

22. The system of claim 21 wherein said high-bandwidth decoder includes a Context Based Adaptive Binary Arithmetic Coding system that is implemented primarily as hardware circuitry according to a H.264/AVC Video Compression Standard.

23. The system of claim 21 wherein said low-bandwidth decoder includes a Run-Length Encoder decoding system that is implemented primarily as executable software instructions.

24. The system of claim 1 wherein said encoding means comprises an entropy encoder that includes a rate controller that monitors quality characteristics of said encoded data, said rate controller responsively providing an adjustable quantization parameter to a quantizer via a feedback loop to thereby dynamically control compression characteristics of said encoded data.

25. The system of claim 1 wherein said encoding means comprises an entropy encoder that is configured according to an encoder configuration procedure to facilitate said entropy encoder to be implemented as a standard commercially-available component, said encoder configuration procedure being performed to allow said entropy encoder to successfully process one or more non-standard data formats.

26. The system of claim 25 wherein said entropy encoder includes a Context-Based Adaptive Binary Arithmetic Coding system that is implemented primarily as hardware circuitry according to a H.264/AVC Video Compression Standard.

27. The system of claim 25 wherein said encoder configuration procedure causes tile information to be encoded according to programmable encoder configuration parameters, said tile information including quantized coefficients, tile size, and a quantization parameter, said encoder configuration procedure defining each of said data tiles as a slice, said encoder configuration procedure grouping all sub-bands of said data tiles together into a sub-band grouping with a data size that is identical to said data tiles, said encoder configuration procedure causing said sub-band grouping to be divided into macroblocks that are compatible with said entropy encoder.

28. The system of claim 25 wherein said encoder configuration procedure defines programmable encoder configuration parameters that include sequence header parameters for groups of frames of input data, picture header parameters for individual frames of input data, slice header parameters for individual tiles of input data, and macroblock header parameters for individual macroblocks, said macroblock header parameters including a coded-block pattern parameter that is programmed to allow separately encoding YUV components, said macroblock header parameters farther including a MB type parameter that is programmed to specify that only I frames are encoded as macroblocks.

29. The system of claim 1 farther comprising a decoding system that performs a decoding procedure upon said encoded data, said decoding system reversing individual process steps performed by said encoding system to thereby regenerate said source data.

30. The system of claim 1 wherein said encoding system is implemented in a System-On-Chip (SOC) device that also includes a Central Processing Unit and/or a Graphics Processing Unit, said Graphics Processing Unit programmatically performing a Discrete Waveform Transform analysis function to feed subbands to quantizer, said Graphics Processing Unit also include a CABAC encoder for generating encoded data from compressed data received from said quantizer.

* * * * *

UNITED STATES PATENT AND TRADEMARK OFFICE
CERTIFICATE OF CORRECTION

| | | |
|---|---|---|
| PATENT NO. | : 7,460,725 B2 | |
| APPLICATION NO. | : 11/595505 | |
| DATED | : December 2, 2008 | |
| INVENTOR(S) | : Krishna Mohan Malladi et al. | |

It is certified that error appears in the above-identified patent and that said Letters Patent is hereby corrected as shown below:

In column 18, line 25, in Claim 28, delete "farther" and insert -- further --, therefor.

In column 18, line 28, in Claim 29, delete "farther" and insert -- further --, therefor.

Signed and Sealed this
Third Day of May, 2011

David J. Kappos
*Director of the United States Patent and Trademark Office*